(12) United States Patent
Muenstermann

(10) Patent No.: US 8,220,120 B2
(45) Date of Patent: Jul. 17, 2012

(54) METHOD OF MAKING A FIBER LAMINATE

(76) Inventor: Ullrich Muenstermann, Egelsbach (DE)

( * ) Notice: Subject to any disclaimer, the term of this patent is extended or adjusted under 35 U.S.C. 154(b) by 0 days.

(21) Appl. No.: 13/161,524

(22) Filed: Jun. 16, 2011

(65) Prior Publication Data

US 2011/0240219 A1   Oct. 6, 2011

Related U.S. Application Data

(62) Division of application No. 12/089,728, filed on Apr. 10, 2008, now abandoned.

(30) Foreign Application Priority Data

Oct. 10, 2005  (DE) .......................... 10 2005 048 758
Oct. 4, 2006  (WO) ................. PCT/EP2006/009579

(51) Int. Cl.
*D04H 5/03* (2012.01)
(52) U.S. Cl. ......................................................... 28/104
(58) Field of Classification Search ............... 28/104, 28/105, 167, 106, 103; 156/148, 285; 442/384, 442/385, 387, 408
See application file for complete search history.

(56) References Cited

U.S. PATENT DOCUMENTS

| | | | |
|---|---|---|---|
| 4,735,849 A * | 4/1988 | Murakami et al. ............. 442/363 |
| 5,144,729 A | 9/1992 | Austin et al. ..................... 28/105 |
| 5,827,597 A * | 10/1998 | James et al. .................... 428/131 |
| 2002/0168910 A1 | 11/2002 | Vuillaume et al. ............. 442/381 |
| 2003/0001088 A1 | 1/2003 | Bateman et al. ............... 250/287 |
| 2003/0106195 A1 | 6/2003 | Fleissner .......................... 28/104 |
| 2005/0003720 A1 * | 1/2005 | Noelle .............................. 442/59 |
| 2005/0061356 A1 * | 3/2005 | Wong et al. ......................... 134/6 |
| 2005/0155200 A1 | 7/2005 | Fleissner .......................... 28/104 |
| 2005/0188513 A1 * | 9/2005 | Vuillaume et al. ............... 28/103 |
| 2007/0022586 A1 * | 2/2007 | Sommer et al. .................. 28/104 |
| 2007/0033779 A1 | 2/2007 | Orlandi et al. ................... 28/100 |
| 2007/0128411 A1 * | 6/2007 | Kawai et al. .................... 428/170 |
| 2007/0143976 A1 | 6/2007 | Sommer .......................... 28/121 |
| 2008/0264550 A1 | 10/2008 | Sommer et al. ............... 156/167 |

FOREIGN PATENT DOCUMENTS

DE   102004030393   1/2006
WO   WO 2005012618   2/2005

* cited by examiner

*Primary Examiner* — Amy Vanatta
(74) *Attorney, Agent, or Firm* — Andrew Wilford

(57) ABSTRACT

A fiber laminate is made by providing a core layer of absorptive fiber material between two outer carrier layers to form a three-layer laminate. This three-layer laminate is then directly juxtaposed with a rigid template formed with an array of throughgoing holes separated by webs. Water jets are then directed at the three-layer laminate juxtaposed with the template to drive the fibers of the core layer out from between the carrier layers at the webs and to hydroentangle the outer layers directly with each other at the webs while leaving the core layer generally intact between the webs at the holes.

12 Claims, 1 Drawing Sheet

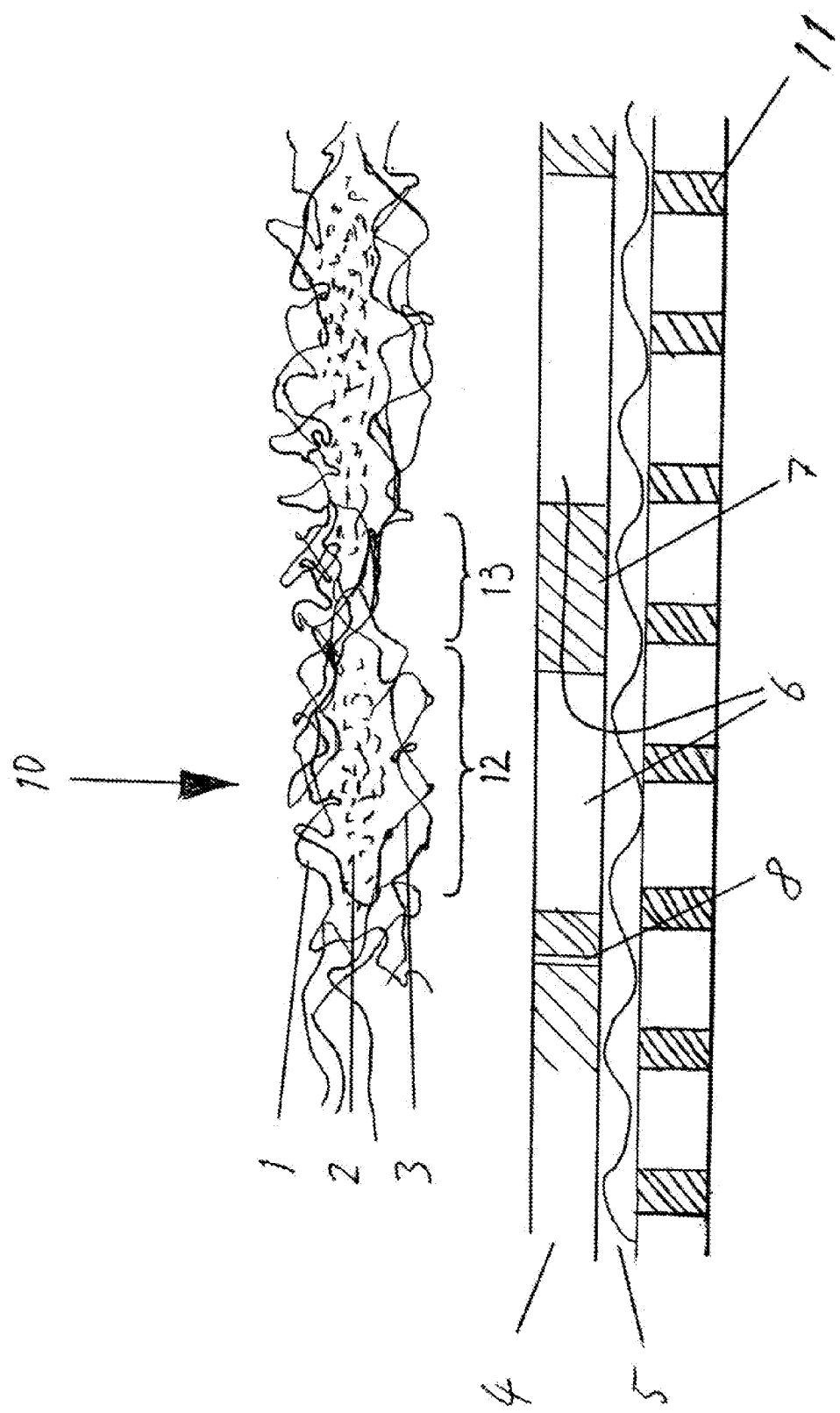

METHOD OF MAKING A FIBER LAMINATE

CROSS REFERENCE TO RELATED APPLICATIONS

This application is a division of U.S. patent application Ser. No. 12/089,728 filed 10 Apr. 2008 as the US national stage of PCT application PCT/EP2006/009579, filed 4 Oct. 2006, published 19 Apr. 2007 as WO2007/042180, and claiming the priority of German patent application 102005048758.0 itself filed 10 Oct. 2005, whose entire disclosures are herewith incorporated by reference.

FIELD OF THE INVENTION

The invention relates to a fiber laminate which comprises two carrier layers or webs and absorptive fiber material inserted between the two carrier layers and bonded thereto by hydroentanglement. The invention further relates to a method of making such a fiber laminate.

BACKGROUND OF THE INVENTION

EP 1 250 482 (US 2003/0106195 and U.S. Pat. No. 6,836,938) a method is known for the production of a composite nonwoven consisting of at least one carrier layer, for example a spunbond web, and one layer of wood pulp deposited on such a carrier layer for producing a hygiene product, wherein the spunbond web is consolidated in dry condition for preliminary bonding prior to coating with the super-absorbent material, the wood pulp layer is then added and both together are bonded by means of hydroentanglement and then are dried.

Furthermore EP 1 524 350 (US 2005,0085149) describes a fiber laminate, in particular an absorbent cleaning cloth, consisting of at least one pre-consolidated spunbond web made of filaments and at least one fiber layer made of hydrophilic fibers, wherein the fiber laminate is hydrodynamically consolidated and wherein embossed deformations are incorporated into the surface of the hydrodynamically consolidated fiber laminate. When producing such wiping and cleaning cloths, the two outer layers consisting of pre-consolidated spunbond webs and the inner layer consisting of air-laid pulp are bonded with each other by hydroentanglement.

Such products offer satisfactory properties with respect to costs and strength values, but in practical use their insufficient thickness and absorptive capacity are criticized. In addition, the delamination strength of the individual layers produced by the water jet treatment is not sufficient so that, especially in moist condition, the layers easily separate again. This disadvantage is partially remedied in the above-mentioned EP 1 524 350 by preliminary embossing of the web layers used or by subsequent embossing of the bonded end product.

OBJECT OF THE INVENTION

It is the object of the present invention to provide a fiber laminate together with a method of making it which offers sufficient delamination stability and high absorptive capacity.

SUMMARY OF THE INVENTION

This object is attained by a fiber laminate that according to the invention comprises two carrier layers and absorptive fiber material inserted between these two carrier layers and bonded thereto by hydroentanglement. When looking at the surface area of this fiber laminate, there are sections with absorptive fiber material between the two carrier layers and sections where the two carrier layers directly touch each other.

In this way, sections are created where the two carrier layers forming the outside layers are directly connected with each other. This distinctly increases the delamination stability. This was demonstrated by trials in which the forces required for delamination were measured in dry and moist condition of the fiber laminate. The stability in moist condition of a fiber laminate according to the invention is very strongly increased compared to conventional fiber laminates. The absorptive fiber material is contained in individually separated square sections between the two carrier layers. The overall impression of the fiber laminate is that of a knobbed nonwoven with embeddings similar to a quilt.

In the process for production of such a fiber laminate absorptive fiber material is placed between two carrier layers. The three layers, namely the two carrier layers with the absorptive fiber material placed in between, are consolidated by means of hydroentanglement using a structuring perforated template with the openings in the template being of just such a size that the absorptive fiber material between the two carrier layers is washed away from the sides of the webs of the template toward the openings of the template by the water jet treatment. For this purpose, a corresponding device for production of the fiber laminate is provided with a structuring perforated template having openings with a diameter between 0.5 and 20 mm. Contrary to the known openings in a microporous shell, these openings are distinctly bigger because they are not designed for draining any liquid but for taking up the fibers of the absorptive fiber material between the two carrier layers which are washed away from the webs of the template. The width of the webs is preferably selected within a range from 1 to 5 mm.

The carrier layers either consist of spunbond webs or layers made of staple fibers which are preferably pre-bonded in dry condition, for example by calendering.

The absorptive fiber material favorably consists of a pulp layer, such as tissue, or a super-absorbent layer.

The areal weight of the carrier layers usually ranges from 3 to 18 g/cm2 and in particular from 6 to 10 g/cm2. The average areal weight of the absorptive fiber material preferably lies between 8 and 100 g/cm2 and in particular between 20 and 50 g/cm2.

The areas of absorptive material are preferably distributed over the surface of the fiber laminate in such a way that they provide the fiber laminate with a knobbed structure. It is also conceivable to use such structures of an arbitrary geometry in order to provide the fiber laminate with an attractive optical design as, for example, in the shape of a flower pattern formed by several structures.

The structuring template is favorably designed as drum shell or endless shell.

BRIEF DESCRIPTION OF THE DRAWING

The invention will be exemplified below by reference to the drawing whose sole FIGURE is a sectional view illustrating the laminate and method of this invention.

SPECIFIC DESCRIPTION

In a lateral cross-section through a fiber laminate above a section of a drum shell, water jets 10 meet the fiber laminate, which consists first of a carrier layer 1 made of spunbond web at the top, absorptive fiber material 2 underneath and a second carrier layer 3 also made of spunbond web at the bottom. In a limited surface region or area 12, absorptive fiber material 2 is between the top carrier layer 1 and the bottom carrier layer 3. In another limited surface region or area 13, the top carrier layer 1 and bottom carrier layer 3 are in direct contact with each other.

This structure is created by the water jets 10 impinging from the top is deflected laterally by carrier layers 7 of a template 5 to openings 6 to wash away the absorptive fiber material 2. The impact of the water jets 10 thus literally forces the absorptive fiber material 2 away from the carrier layer 7 toward the openings 6. Located underneath the structuring template 4 is a support wire mesh 5 with a supporting drum shell 11 underneath. The supporting wire mesh 5 can be generally designed as a porous body or also as a microporous shell. Shown beside the openings 6 of the template 4 is a distinctly smaller capillary opening 8, which is used for removal of water and for this purpose has a rather small diameter in a range of less than 0.45 mm.

I claim:

1. A method of making a fiber laminate, the method comprising the steps of sequentially:
    providing a core layer of absorptive pulp fiber material between two outer carrier layers of spunbond web to form a three-layer laminate;
    juxtaposing the three-layer laminate directly against a rigid template formed with an array of throughgoing holes separated by webs; and
    directing water jets at the three-layer laminate juxtaposed with the template to drive fibers of the pulp core layer out from between the spunbond carrier layers at the webs and to hydroentangle the spunbond outer layers directly with each other at the webs while leaving the pulp fiber core layer generally intact between the webs at the holes.

2. The method defined in claim 1, further comprising the step of
    using a template having holes with diameters between 0.5 and 20 mm.

3. The method defined in claim 1, wherein the template is part of a structuring drum.

4. The method defined in claim 1, wherein the template is part of an endless belt.

5. The method defined in claim 1, wherein the carrier layers each weigh between 3 $g/cm^2$ and 6 $g/cm^2$.

6. The method defined in claim 1, wherein the carrier layers each weigh between 6 $g/cm^2$ and 10 $g/cm^2$.

7. The method defined in claim 1, wherein the core layer weighs between 8 $g/cm^2$ and 100 $g/cm^2$.

8. The method defined in claim 1, wherein the core layer weighs between 20 $g/cm^2$ and 50 $g/cm^2$.

9. The method defined in claim 1, further comprising the step of
    prebonding the carrier layers to the core layer while dry before juxtaposition of the core and carrier layers with the template.

10. The method defined in claim 9 wherein the carrier layers are prebonded to the core layer by calendering.

11. The method defined in claim 1, further comprising the step of
    using a template with openings between 0.5 and 20 mm in diameter.

12. The method defined in claim 1, further comprising the step of
    using a template with webs having a width of between 1 and 5 mm.

* * * * *